Patented May 24, 1927.

1,629,716

UNITED STATES PATENT OFFICE.

ALBERT LEO, OF WINFIELD, ILLINOIS.

JELLY PREPARATION.

REISSUED

No Drawing.　　Application filed October 5, 1925. Serial No. 60,687.

This invention relates to a jelly preparation particularly adapted for use in making jams and jellies. In general, pure jelly will contain from 50 to 65% sugar, ½ to 1% pectin, ⅓ to ½ of 1% acid, and 35 to 50% water. If all of the above ingredients are present and in the proportions given, if the mass is heated to 218° Fahrenheit and then allowed to cool, it will set into a semi-solid jell. In making jellies for household use the difficulty lies in the fact that various fruits have varying amounts of pectin and acid, some having sufficient pectin but not enough acid, and others having too much acid and not enough pectin, with the result that either one or the other ingredients must be increased to form a jelly from the fruit. It is customary to increase the concentration of pectin or acid by evaporating the fruit juices. This procedure produces a cooked taste and in some fruits which have a strong natural flavor results in a very disagreeable flavor when concentrated. Many other fruits have mild flavors that are readily affected by heat.

It is therefore an object of this invention to provide a jelly preparation which contains in suitable form all of the ingredients required to cause jellying action when added in definite proportions to unconcentrated fruit juices, thereby eliminating the necessity for boiling down the fruit juices, and the resultant loss of the natural flavor of the fruit.

It is a further object of this invention to provide a preparation for making jellies and the like which is in dry, granulated form suitable for immediate use without addition of other ingredients than the natural fruit may contain.

Other and further important objects of this invention will be apparent from the disclosures in the specification and appended claims.

The proportion of sugar, pectin and acid to each other necessary to make a good jelly is fairly definite, but the obtaining of a satisfactory mixture of these ingredients in the proportion necessary presents certain difficulties, for the reason that while sugar is ordinarily granulated, pectin and fruit acids are, in general, powders. The result is that when the granulated sugar, pectin and acid are mixed, the powdered pectin and acid sift through the sugar granules and do not form a homogeneous mixture.

I have found that by first mixing the fruit pectin and fruit acid and then thoroughly mixing this mixture with granulated sugar in a moistened or wet condition a very homogeneous mixture may be obtained. My process in a preferred form is substantially as follows:

The pectin or other gum suitable for jelly making is first ground to a very fine powder. Apple or citrus pectins are very satisfactory. Fruit acid, such as citric acid, should also be in a finely ground form. For sugar I prefer to use the granulated variety since its use results in a product resembling the sugar to which the housewife is ordinarily accustomed. The acid and pectin are thoroughly mixed and added to the sugar which contains or has had added to it substantially 3% of water by weight. The approximate proportions of sugar, pectin and acid are as follows: 100 parts sugar, 1 part pectin, ⅓ part acid, and 3 parts water.

The amount of water used is insufficient to dissolve the pectin or acid, nor is it sufficient to alter the granular form of the sugar by partially dissolving the same. It is merely necessary to have sufficient moisture present to cause the pectin and acid to adhere to the sugar crystals and form a glue-like coating thereover. After the mixture is thoroughly homogeneous it is dried. The product still resembles granulated sugar, the granules now being coated with the pectin and acid.

This jelly preparation is now in a form suitable for use in making jelly without reference to the amount or proportion of sugar, pectin and acid contained in the fruit juices from which the jelly is to be made. It is simply necessary to add to the natural unconcentrated fruit juice an equal amount by weight of the jelly preparation and then heat the entire mixture to approximately 218° Fahrenheit. When the mixture is allowed to cool it will set into a semi-solid jell.

By following this procedure for making jelly and the like the natural flavors of the fruit used in making the jelly are not destroyed nor altered in any way. Furthermore the procedure is simple and practically fool-proof.

I am aware that many changes may be made and numerous details of the process may be varied through a wide range without departing from the principles of this invention, and I therefore do not purpose limiting the patent granted hereon, otherwise than necessitated by the prior art.

I claim as my invention:

1. A jelly preparation comprising granulated sugar having a coating formed thereon of a pectin containing substance and an edible fruit acid.

2. The method of making a jelly preparation, which consists in adding to granulated sugar in a moistened condition a pectin containing substance and a fruit acid, mixing the same to form a homogeneous mass of sugar granules coated with the pectin containing substance and fruit acid and drying the mass without destroying the granular structure.

3. The method of making a jelly preparation which consists in coating granulated sugar with a mixture of a fruit pectin and a fruit acid, all being in an insufficient amount of water to dissolve the same and drying the thus coated sugar without destroying the granular structure.

4. The method of making a jelly preparation which consists in moistening sugar with substantially 3% by weight of water, mixing therewith powdered pectin and a fruit acid and drying the mixture.

In testimony whereof I have hereunto subscribed my name.

ALBERT LEO.